July 27, 1937.  B. NOLTE  2,088,209
TURF FORKING APPARATUS
Filed Oct. 10, 1936  2 Sheets-Sheet 2
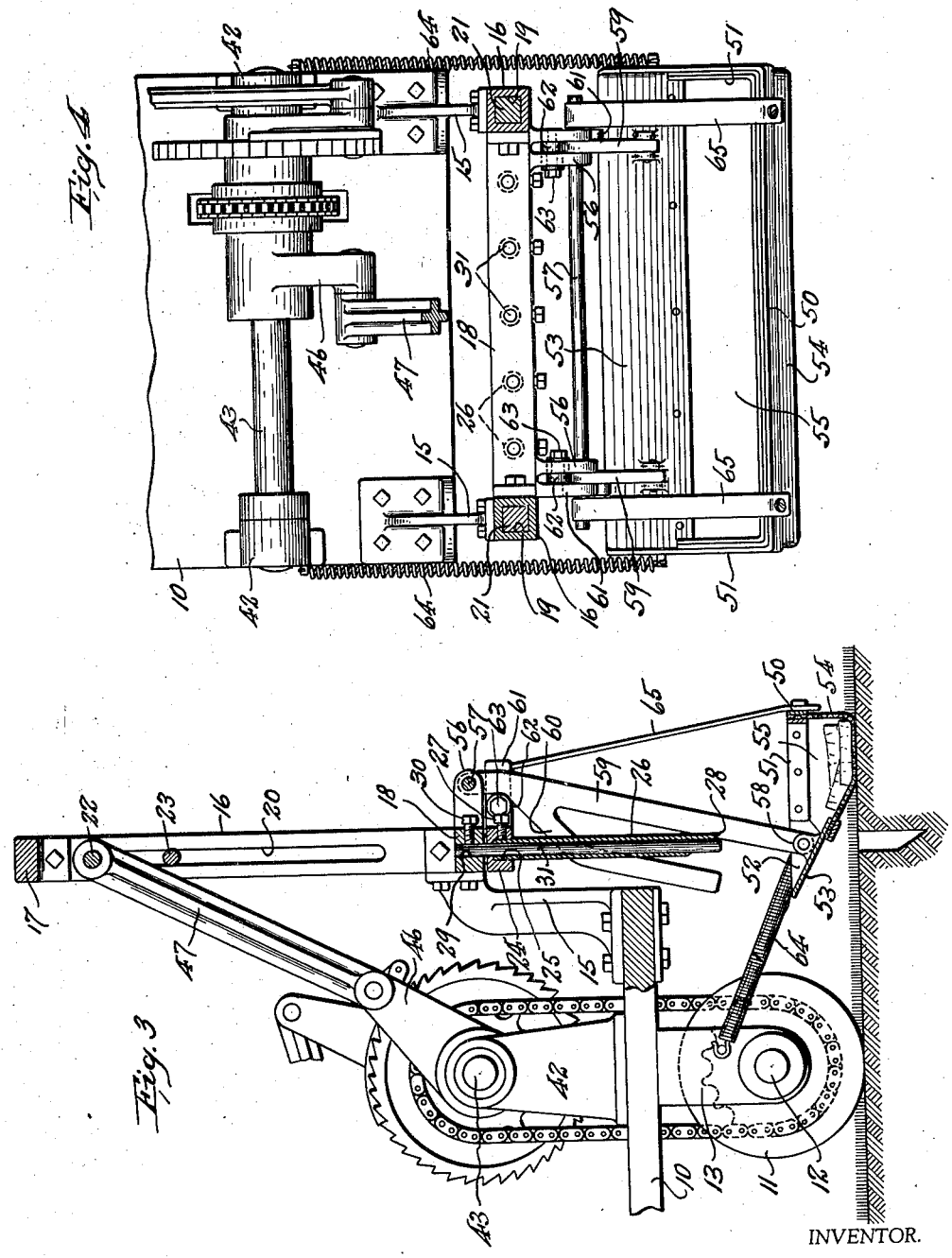
INVENTOR.
Bernhard Nolte,
BY
George D. Richards
ATTORNEY.

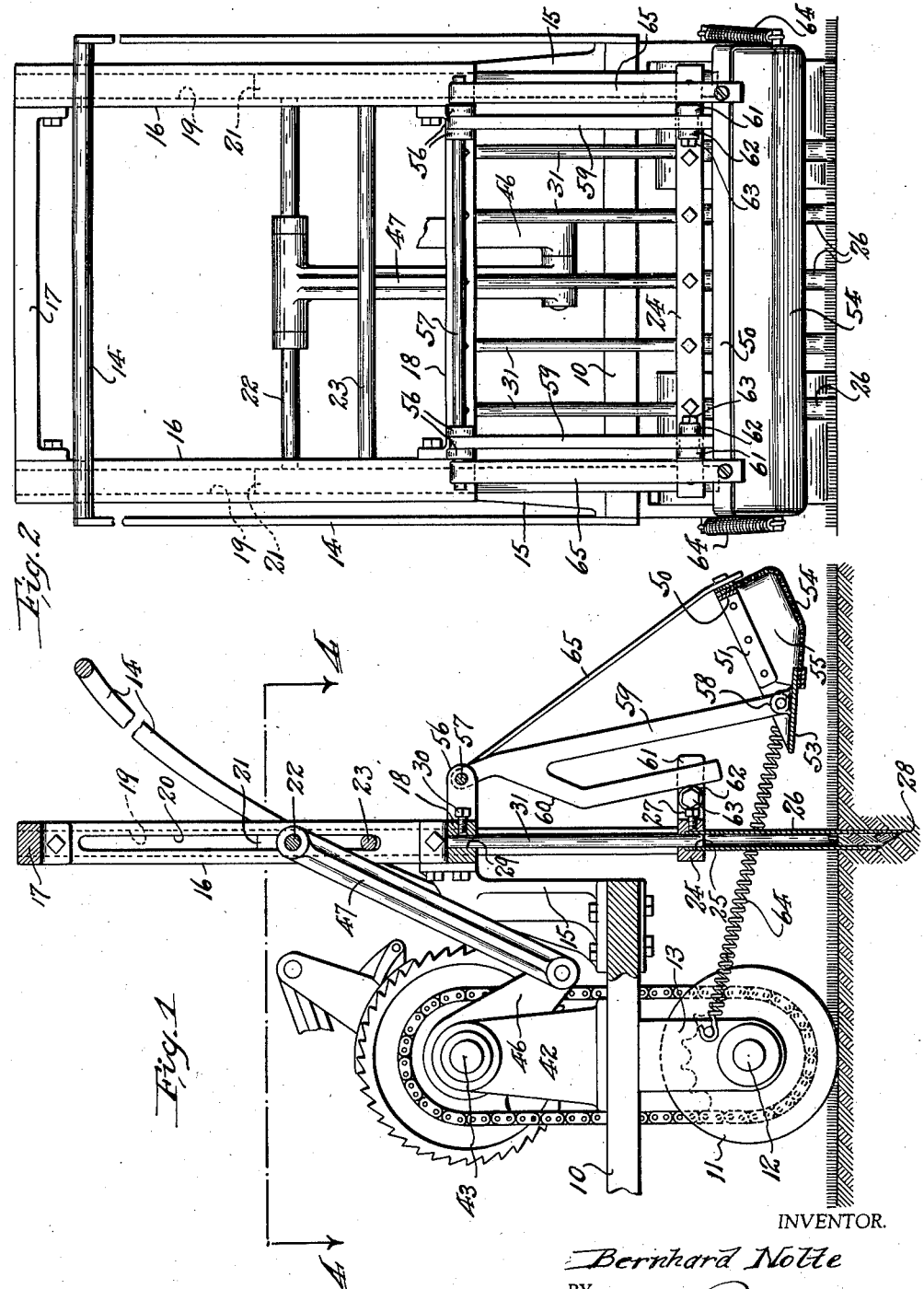

Patented July 27, 1937

2,088,209

UNITED STATES PATENT OFFICE 2,088,209

TURF FORKING APPARATUS

Bernhard Nolte, Westfield, N. J.

Application October 10, 1936, Serial No. 104,949

8 Claims. (Cl. 97—36)

This invention relates to improvements in turf forking apparatus of the kind disclosed in my copending application for Letters Patent Ser. No. 32,345/35, filed July 20, 1935; and the present invention has reference, more particularly, to automatic means, cooperative with the reciprocated fork tines of the apparatus, for collecting the plugs removed from the turf bearing soil during operation of the apparatus.

In my aforesaid co-pending application I have shown a novel construction of power driven turf forking apparatus having tubular fork tines adapted to be automatically reciprocated so as to cut and remove plugs out of turf under treatment, thereby to form in the turf bearing soil clean cut openings for the reception of water, air, and fertilizers or other soil dressings or enriching agents. The present invention has for its primary object to provide, in connection with such turf forking apparatus an automatic means for collecting the removed soil plugs discharged from the tubular fork tines, together with actuating means adapted to oscillate the collecting means in timed relation to the reciprocable movements of the fork tines, so as to carry said collecting means under the latter as they are withdrawn from the soil, whereby said collecting means is positioned to receive the soil plugs when discharged from said fork tines and then removed from the path of movement of the latter as the same descend for a succeeding soil perforating operation.

Other objects of this invention, not at this time more particularly enumerated, will be understood from the following detailed description of the same.

An illustrative embodiment of the features of the present invention is shown in the accompanying drawings, in which:

Fig. 1 is in part a side elevation and in part a sectional view of the rear end portion of the turf forking apparatus as equipped with the novel soil plug collecting means and actuating mechanism therefor, this view showing the collecting means in position removed from the path of fork tine movement; Fig. 2 is an end elevation of the same; Fig. 3 is a view similar to that of Fig. 1, but showing the collecting means in operative position beneath the upwardly withdrawn fork tines; and Fig. 4 is a horizontal section, taken on line 4—4 in Fig. 1.

Similar characters of reference are employed in the above described views, to indicate corresponding parts.

Referring to said drawings, the reference character 10 indicates the platform of the apparatus carriage, the rear traction wheels 11 of which are mounted on axle 12 suitably journaled in bearing members 13 which project from the underside of said platform.

The forking means of the apparatus is supported from the platform 10 so as to overhang the rearward end of the latter. A handle frame 14 is suitably affixed to platform 10, whereby the operator may guide and direct the movement of the carriage.

The forking means comprises a preferably perpendicular guide frame which is attached to platform 10 by means of off-setting supporting brackets 15. This frame, in an illustrative form and arrangement thereof, comprises a pair of laterally spaced upright tubular guide members 16, connected together at their upper ends by top cross-bar 17, and at their lower ends by bottom cross-bar 18, which respectively extend therebetween. Each guide member 16 is provided throughout its length with an internal guideway or slideway 19. Formed in the opposed inwardly facing walls of said guide members 16, intermediate the top and bottom cross-bars 17 and 18, are longitudinal slots 20. Slidably movable in guideways or slideways 19 are vertically reciprocable slide-bars 21, the upper end portions of which are connected together by an upper cross-head 22 adapted to ride in said slots 20. A bracing or reenforcing cross-head 23 is also connected between said slide-bars 21, below and in spaced relation to said upper cross-head, said cross-head 23 being likewise arranged to ride in said slots 20. Secured to and between the downwardly projecting free end portions of slide-bars 21 is a transverse base-bar 24. The thus associated slide-bars, cross-heads and base-bar form a reciprocable fork frame vertically movable in connection with said guide frame.

Base-bar 24 is provided with a plurality of laterally spaced downwardly open sockets 25 to receive the butt ends of tubular fork tines 26 which are affixed thereto by set-screws 27. The lower free ends of said fork tines are obliquely cut so as to provide such ends with soil penetrating pointed portions 28. The bottom cross-bar 18 of the guide frame is provided with a plurality of downwardly open sockets 29, spaced to correspond in number and position to the number and position of the fork tines 26. Affixed by their butt ends in said sockets 29, as by set-screws 30, are fixed ejector rods 31 which extend downwardly so as to enter through the base-bar 24 respectively into the interiors of the fork tines 26, whereby the latter, when reciprocated, will slide up and down over said ejector rods 31.

Means for supplying and transmitting actuating power is provided to operatively reciprocate the forking means, such, for example, as shown in my co-pending application above mentioned. This means includes bearing members 42 affixed on the carriage platform 10 in and between which is mounted a rock-shaft 43. Arranged to be oscillated by the driven movements of said rock-shaft 43 is a lever arm 46, to which is pivotally connected one end of a connecting rod 47. The other end of said connecting rod is pivotally connected to the upper cross-head 22 of the reciprocable fork frame. Operative oscillation of lever arm 46 is transmitted through said connecting rod 47 to said fork frame, whereby the latter is vertically reciprocated to produce downward movement of the fork tines, so that the latter are caused to penetrate the turf bearing soil, and then upward movement thereof to withdraw the same from the soil and remove from the latter the soil plugs cut therefrom. Upward movement of the tubular fork tines 26 causes the same to slide telescopically over the ejector rods 31, which, in effect, descend through the tine interiors and thereby eject the soil plugs from the lower ends of the tines.

According to the present invention means are provided to catch and hold the soil plugs, when the same are ejected from the tines as above mentioned. This means comprises an oscillatable collector having timed actuating means whereby the same is automatically passed beneath the fork tines, after the latter are withdrawn from the turf bearing soil, and upwardly moved relative to the ejector rods 31, so as to catch and hold the soil plugs ejected from the tines by the time the latter complete their upward or retractive stroke, said ejector being thereupon removed from the path of said tines during the operative soil penetrating stroke thereof.

The collector, in one illustrative form thereof, comprises a frame constituted by a transverse back portion 50 and forwardly projecting side arm extensions 51. Rigidly connected by side brackets 52 to the side arm extensions 51 is a transverse toe-plate 53. This toe-plate is preferably inclined downwardly and inwardly toward the interior of the collector. Secured to said frame and toe-plate, in any suitable manner, is a bag-like body 54 of flexible material, the same forming in conjunction with the frame and toe-plate an upwardly open collecting chamber or receptacle 55.

Suitably affixed to the bottom cross-bar 18 are rearwardly projecting bifurcate bearing brackets 56, in and between which is mounted a transverse fulcrum shaft 57. Pivotally interconnected between said shaft 57 and knuckles 58, with which said collector toe-plate 53 is provided, are suspension links 59. Said suspension links 59 are provided, for inward and downward extension from their inner margins, with cam arms 60, the same springing from a point adjacent to the upper ends of said links.

Suitably affixed to the base-bar 24 of the fork frame are rearwardly projecting ears or lugs 61. These ears or lugs support rollers 62, the bearing studs 63 of which are affixed to said suspension links 59 and their cam arms 60. Pull springs 64 suitably connected between the frame of the collector means and stationary points on the carriage of the apparatus, operate to yieldably swing the collector means inwardly and to hold the suspension links 59 and their cam arms 60 in operative engagement with the rollers 62.

Additional support is provided for the collector means in the form of straps 65 extending between the shaft 57 and said back portion 50 of the collector frame.

In operation, when the fork frame is moved downward to cause the tines 26 to penetrate the turf bearing soil, the rollers 62, which move downward with the base-bar 24, ride over the inclined portions of the suspension link cam arms 60, thereby exerting an outwardly swinging pressure upon suspension links 59 against tension of pull-springs 64. The outward swinging movement of the suspension links 59 carries the collecting chamber or receptacle rearwardly and out of the path of descending movement of the fork tines 26, and holds the same outward while said tines penetrate the turf bearing soil (see Fig. 1). The collecting chamber or receptacle remains thus outwardly and rearwardly moved until the fork tines 26 are upwardly drawn far enough to be withdrawn from the soil, whereupon the upwardly carried rollers 62 reach and travel along the inclined portions of cam arms 60, thereby allowing the pull-springs 64 to swing the collecting chamber or receptacle beneath the rising lower ends of the tines, so that, as the tines complete their rising movement along the ejector rods 31, the soil plugs raised with the tines are ejected therefrom and fall into the collecting chamber or receptacle (see Fig. 3).

It will be understood from the above, that the collecting means will automatically gather the soil plugs, as the same are cut and removed from the turf, and consequently the labor of gathering up said plugs, which would otherwise be scattered over the surface of the turf, is avoided. The collector receptacle may be emptied from time to time, by merely swinging the same rearwardly and upwardly against the tension of pull-springs 64.

I am aware that changes may be made in the above described constructions and many widely different embodiments of the present invention could be made without departing from the scope thereof. It is therefore intended that all matter contained in the above description and shown in the accompanying drawings shall be interpreted as illustrative and not in a limiting sense.

I claim:—

1. In apparatus of the kind described, a reciprocable forking means having tubular tines and ejector rods with which said tines are in telescopic slidable relation, a soil plug collecting means, and means to automatically oscillate said collecting means in timed relation to the reciprocal movements of said forking means, whereby on rising movement of said tines, said collecting means is positioned beneath the same to receive soil plugs ejected therefrom by said ejector rods.

2. In apparatus of the kind described, a wheeled carriage, an upright guide frame supported by said carriage, a forking means reciprocable in said frame, said forking means having downwardly directed tubular tines, ejector rods carried by said frame with which said tines are in telescopic slidable relation, means for reciprocating said forking means, a soil plug collecting means, and means to automatically oscillate said collecting means in timed relation to the reciprocal movements of said forking means, whereby, on rising movement of said tines, said collecting means is positioned beneath the same to receive soil plugs ejected therefrom by said ejector rods.

3. In apparatus of the kind described, a reciprocable forking means having tubular tines, a guide frame for said forking means ejector rods with which said tines are in telescopic slidable relation, a soil plug collecting means, pivoted suspension means for said collecting means, cam means connected with said suspension means, and actuating means reciprocated with said forking means to operatively engage said cam means so as to oscillate said collecting means in timed relation to the reciprocal movements of said forking means and its tines.

4. In apparatus of the kind described, a reciprocable forking means having tubular tines, a guide frame for said forking means, ejector rods with which said tines are in telescopic slidable relation, a soil plug collecting means, pivoted suspension means for said collecting means, cam means connected with said suspension means, actuating means reciprocated with said forking means to operatively engage said cam means so as to oscillate said collecting means in timed relation to the reciprocal movements of said forking means and its tines, and spring means to maintain said cam means and actuating means in cooperative collector means controlling relation.

5. In apparatus of the kind described, a wheeled carriage, an upright guide frame supported by said carriage, a forking means reciprocable in said frame, said forking means having downwardly directed tubular tines, ejector rods carried by said frame with which said tines are in telescopic slidable relation, means for reciprocating said forking means, a soil plug collecting means, pivoted suspension means for said collecting means, cam means connected with said suspension means, and actuating means reciprocated with said forking means to operatively engage said cam means so as to oscillate said collecting means in timed relation to the reciprocal movements of said forking means and its tines.

6. In apparatus of the kind described, a wheeled carriage, an upright guide frame supported by said carriage, a forking means reciprocable in said frame, said forking means having downwardly directed tubular tines, ejector rods carried by said frame with which said tines are in telescopic slidable relation, means for reciprocating said forking means, a soil plug collecting means, pivoted suspension means for said collecting means, cam means connected with said suspension means, actuating means reciprocated with said forking means to operatively engage said cam means so as to oscillate said collecting means in timed relation to the reciprocal movements of said forking means and its tines, and spring means to maintain said cam means and actuating means in cooperative collector means controlling relation.

7. In apparatus of the kind described, a wheeled carriage, an upright guide frame supported by said carriage, a forking means reciprocable in said frame, said forking means having downwardly directed tubular tines, ejector rods carried by said frame with which said tines are in telescopic slidable relation, means for reciprocating said forking means, a soil plug collecting means, suspension links for said collecting means, means on said frame for pivoting said suspension links, cam arms connected with said suspension links, and cam arm engaging rollers carried by said forking means, all whereby said collecting means is oscillated in timed relation to the vertical reciprocation of said tines so that on rising movement of the latter said collecting means is positioned beneath the same to receive soil plugs ejected therefrom by said ejector rods.

8. In apparatus of the kind described, a wheeled carriage, an upright guide frame supported by said carriage, a forking means reciprocable in said frame, said forking means having downwardly directed tubular tines, ejector rods carried by said frame with which said tines are in telescopic slidable relation, means for reciprocating said forking means, a soil plug collecting means, suspension links for said collecting means, means on said frame for pivoting said suspension links, cam arms connected with said suspension links, cam arm engaging rollers carried by said forking means, and spring means operative to maintain cooperative engagement of said cam arms and cam arm engaging rollers.

BERNHARD NOLTE.